United States Patent [19]
Maxey

[11] 3,861,261
[45] Jan. 21, 1975

[54] APPARATUS FOR POSITIONING, HOLDING AND DIE-CUTTING RESILIENT AND SEMI-RESILIENT STRIP MATERIAL

[75] Inventor: W. Clarence Maxey, Bedford, Va.

[73] Assignee: Rubatex Corporation, Bedford, Va.

[22] Filed: Nov. 9, 1973

[21] Appl. No.: 414,338

[52] U.S. Cl. .............................. 83/387, 83/416, 83/419, 83/420
[51] Int. Cl. ........................... B26d 7/02, B26d 7/16
[58] Field of Search ............. 83/387, 386, 385, 389, 83/420, 373, 206, 416, 212, 419

[56] References Cited
UNITED STATES PATENTS

| | | | |
|---|---|---|---|
| 2,165,614 | 7/1939 | Cook et al. ........................... | 83/206 |
| 2,629,443 | 2/1953 | Girardello ......................... | 83/387 X |

*Primary Examiner*—J. M. Meister
*Attorney, Agent, or Firm*—Mason, Fenwick & Lawrence

[57] ABSTRACT

A novel positioning and die-cutting mechanism together with an automatic material feed mechanism used in association with cutting presses, to facilitate both manual and automatic feeding of, and the accurate positioning and cutting of soft cellular rubber and/or plastic material, in continuous strip form, which mechanisms provide significantly improved safety factors and production output of articles made therefrom. Apart from the power-operated rollers of the feed mechanism, the improved die-cutting mechanism includes a sensitive cam-operated lever and linkage system in conjunction with spring-biased positioning and retaining member sub-assembly embodying soft-rubber-faced positioning bars which in correlation with the downward and upward movements of the press cycle, said bars precisely close to position, hold and then automatically release the strip material after the material is die-cut. After the die-cut material is removed from the die, part of the circuitry is again automatically activated to cyclically feed the resilient cellular stock material in timed relationship beneath the elevated press head, whereupon the process is repeated.

25 Claims, 8 Drawing Figures

APPARATUS FOR POSITIONING, HOLDING AND DIE-CUTTING RESILIENT AND SEMI-RESILIENT STRIP MATERIAL

BACKGROUND OF INVENTION

The present invention relates to a novel positioning and die cutting, and automatic material feed mechanism used in conjunction with preferably large automatic cutting presses, to provide not only for substantial improvement in the accurate positioning and accurate cutting of articles made of soft cellular rubber and plastic material, but also to provide significantly improved safety factors and production output.

Heretofore in the manufacture of die-cut rubber materials, and more particularly of strip-like articles such as water skiing safety belts, made from resilient foam rubber or foam plastic material, it has been very difficult to accurately position and retain such resilient material in place beneath a die mounted on a usually vertically reciprocable press head used for die cutting according to the needs of the intended article of manufacture. Such manufacture quite often required workers to work with their hands dangerously beneath the press head. Also the stock material from which the articles are manufactured is often only hand fed into the press and die mechanism, which procedures collectively naturally limit production and otherwise tend to court accidents.

Among known prior art is included a so-called gauge or gauging mechanism for press-slides, set forth in the old Hart et al. U.S. Pat. No. 425,131 dated Apr. 8, 1890. The invention therein related to improvements in gauges intended to gauge the edges of strip metal being cut beneath a press head. Its gauge mechanism helped to accurately center metal stock material with reference to the die and to hold the metal material while it was punched.

While the Hart et al device may appear to be simpler in its construction and operation for holding its particular stock material, it is to be noted that it related only to the positioning of rigid self-supporting materials, such as various metals. In other words, it was not concerned with attempting to solve a problem for the need to accurately position and hold resilient materials of a soft cellular character which were not inherently self-supporting.

Accordingly, because of this significant distinction in material character, it was necessary to evolve a much more delicate or sensitive mechanism and more precise method of handling and feeding the flexible strip material to achieve the necessary degree of perfection in positioning, alignment and holding during die cutting of said soft material.

BRIEF SUMMARY OF INVENTION

A primary object of this invention is to promote both safety and improved production in the manufacture of die-cut foam-type resilient material articles, one type of which is intended for use as a water skiing safety belt.

Another principal object is to safely provide a novel improved die-cutting mechanism which is adaptable to accurately position, hold and facilitate die cutting of various types of resilient soft cellular rubber or vinyl strip materials ranging in size from approximately ½ inch to 3 inches thick, from approximately 1 inch to 8 inches wide, and which articles may be die cut in various lengths and with various end shapes, according to the article design and purpose.

A further object is to significantly improve the safety factors attendant the manufacture of strip articles of the foregoing character, by providing an improved mechanism which completely eliminates the necessity of an operator or worker to work with his hands or arms beneath the press head.

Yet another objet is to provide an improved mechanism which achieves the necessary perfection in alignment of the resilient strip material which is particularly necessary when die cutting designs having arcuate or at least partial radius ends.

The foregoing and other objects and advantages are achieved by the provision of an automatically electrically and mechanically controlled feeding, gauging and/or positioning mechanism for initially automatically feeding the strip material a predeterminable amount into the improved die-cutting mechanism; then accurately positioning and retaining the strip material by means of a sensitive cam-operated lever and linkage system and soft-rubber-faced positioning bars which, in correlation with the press cycle, said bars precisely close to position, hold and then automatically release the strip material after the material is die cut. Subsquently a new predetermined length of stock material is fed in beneath the elevated die head to repeat the improved process each time after the die cut article is removed from the press.

The improved automatic feed and die cutting mechanism will be described in more specific constructional and operational detail hereinafter in connection with the accompanying illustrative drawings.

BRIEF DESCRIPTION OF DRAWINGS

FIGS. 7 and 8 are respectively perspective fragmentary exploded views of two different double cutting dies mountable on the underside of the press head to cut the ends of the resilient material into predetermined shapes at the predetermined set length required to be cut; and also showing fragmentarily perspective views of two forms of the resilient material article cut by the mechanism of this invention, said articles being adaptable for use in the manufacture of safety belts for water skiers and boaters, and the like.

DESCRIPTION OF PREFERRED EMBODIMENT

Briefly there is shown a press P having a conventional vertically reciprocable press head PH, above a press base PB. A cutting die CD is mounted to the underside of the press head PH and is adapted to cut the resilient strip stock material SM which is fed into the press preferably thru a feed roller assembly FR mounted at the forward edge of the press base PB. A novel strip-material-positioning-and-holding mechanism PHM includes components complementally mounted on the press head and press base. This PHM mechanism, together with a material stopping and switch-activating mechanism SSM mounted rearwardly on the press bed, are electrically and mechanically interconnected to work in correlation with the press cycle to thereby effect cyclically repeated automatic feed, stopping, positioning, die cutting and release of the cellular foam material being cut.

Referring to the drawings in greater detail, particularly FIGS. 2–5, the strip material positioning-and-holding mechanism PHM is seen to comprise an opposed pair of laterally movable material-positioning-and-holding bar assemblies 10,10, which are suitably supported in a spring-biased manner upon the press base PB. Bar assemblies 10,10 are moved in timed sequence, all to be described in more detail hereinafter, with the help of transverse-shaft-mounted rotary cam means 12,12, which are activated by an assembly 14,14 of various motivation elements collectively and cooperatively mounted upon both the press head PH and the press base PB.

Starting with those motivation elements which are mounted upon the underside of the press head PH, shown at widely laterally opposed sides of the material feed path are a pair of preferably bifurcated support brackets 16,16 (FIGS. 2 and 5) which may be attached thereto by any suitable means such as bolts or the like. The bifurcated portions of each support bracket 16 are coaxially apertured and preferably provided with aligned press-fit bronze bearing inserts through which a pivot pin 18 is assembled therewith, together with a correspondingly apertured drive-shaft-supporting anchor block 20 pivotally mounted within the bifurcated portion of the support bracket 16. Each block 20 supports an adjustably mounted, relatively short pushable drive shaft 22 by one of its ends disposed within preferably a threaded aperture, the axis of which is disposed at 90° relative to and laterally offset from the swivel pin 18. Shafts 22 perform as a link in the mechanism.

Each shaft 22 has a combined locking and adjustment nut 24 coactive with a complementally threaded portion thereof for retaining the shaft in said block 20, and also for adjusting the amount of shaft projection from the block 20 to prevent the mechanism from locking up during operation. To prevent locking, both of the shafts 22 must be adjusted at an angle of from approximately 5° to 10° from the vertical, with the bottom or lower ends of shafts angled towards the center and each other, as viewed in FIG. 2. The free end of each shaft 22 slidably fits through a preferably bearing-lined aperture in a further pivot type block 26 and has a retention collar 28 adjustably attached on the shaft adjacent the depending free end below the pivot block 26. Each pivot block 26 is preferably provided with one lineal travel type ball bearing 27a to permit a precision movement of the shafts 22 which must reciprocatingly slide through to the requisite amount necessary to enable the press cycle to be completed. Collars 28 serve to adjust the angular setting of arms 38 as well as to adjustably support the pivot blocks 26. Each shaft 22 also is encircled by a compression spring 30 between the adjustment nut 24 and pivot block 26, the purpose of which will become more apparent hereinafter.

Reverting temporarily to the rotary cam means 12, said cam means 12 includes a pair of cam members 32 fixedly attached on fore-and-aft end portions of each of a pair of rotatable cam shafts 34. Shafts 34 are supported in pairs of fore-and-aft base-mounted brackets 36, which shafts 34 are disposed at laterally opposite sides of and parallel to the material feed path. The support brackets are preferably provided with bronze bearings for shafts 34. A pair of cam-shaft-connecting arms 38 are disposed intermediate the fore-and-aft disposed cam members 32, and have one end of each arm fixedly attached to said cam shaft 34 for effecting operative connection of said cam shafts 34 with the press-head-mounted motivation elements. The connecting arms 38,38 have their other ends pivotally connected by transverse pivot or swivel pin 40 to the pivot block 26, as shown. The pivot pins 18 and 40 and shafts 34 are all essentially disposed parallel to one another. The pivot blocks 26 are each preferably provided with a bronze bearing 27b through which the pivot pins 18 are mounted. Preferably the connecting arms 38, which in effect are crank arms, and the cams 32 are connected to their shafts by means of square cross-sectional keys and complemental keyways.

Figures 2, 5:
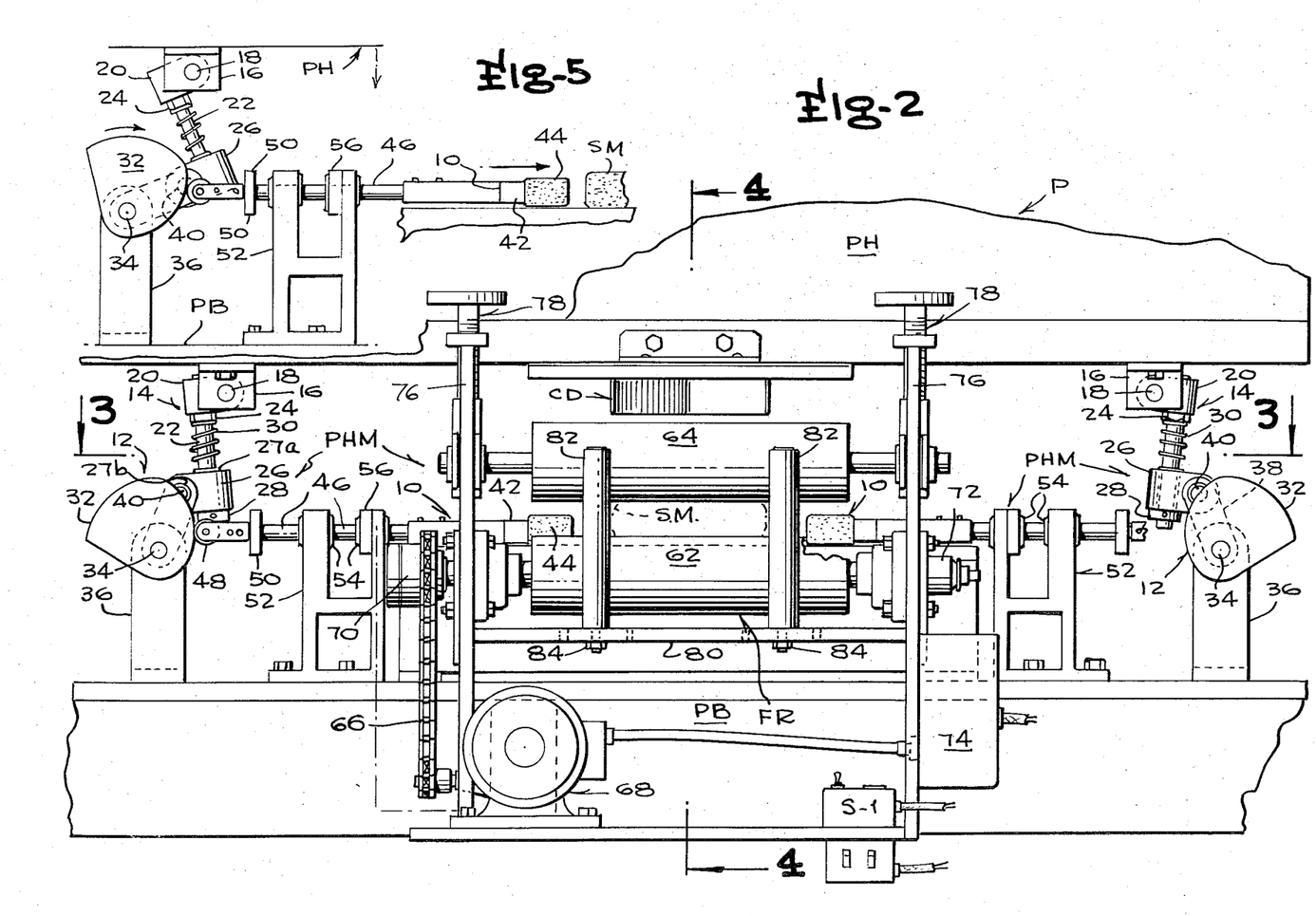
FIG. 2 is an enlarged front elevational view of the assembled strip material feeding-and-positioning mechanism, with part of the lower feed roller and the right side cam follower broken away for clarity of other parts.
FIG. 5 is a fragmentary side view on the same scale as FIG. 2, of the left hand cam and cam-operated positioning-and-holding bar mechanism of FIG. 2 shown in an intermediate position attendant the lowering of the press head.
Figure 3:
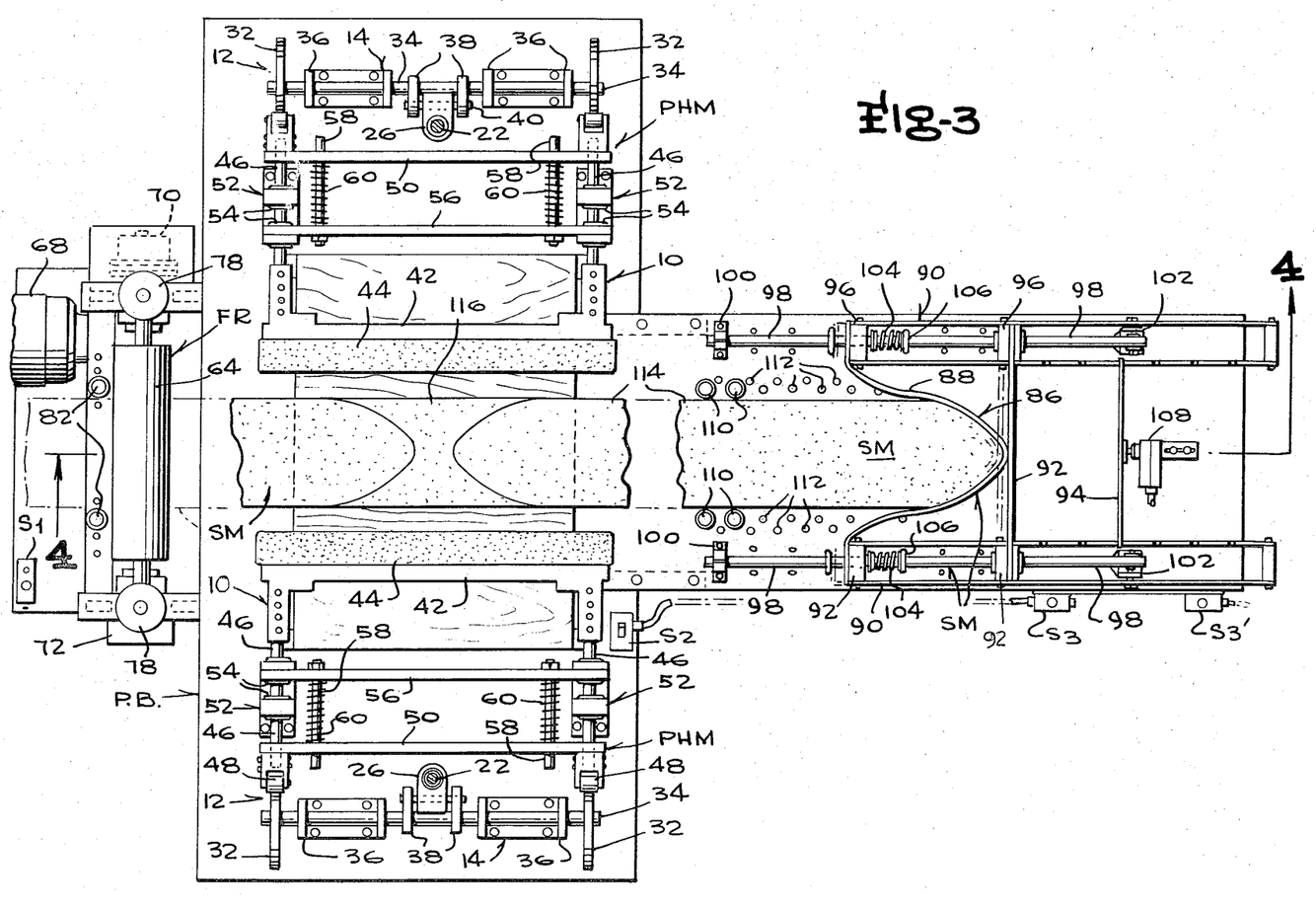
FIG. 3 is a top plan view shown on a reduced scale and viewed substantially on the line 3—3 of the mechanism shown in FIG. 2, with the press head and certain other parts removed for clarity; and also showing a mechanism on the press bed level at the rearward side for automatically stopping the feed of the strip material and helping in initiating the die cutting thereof.
Figure 4:
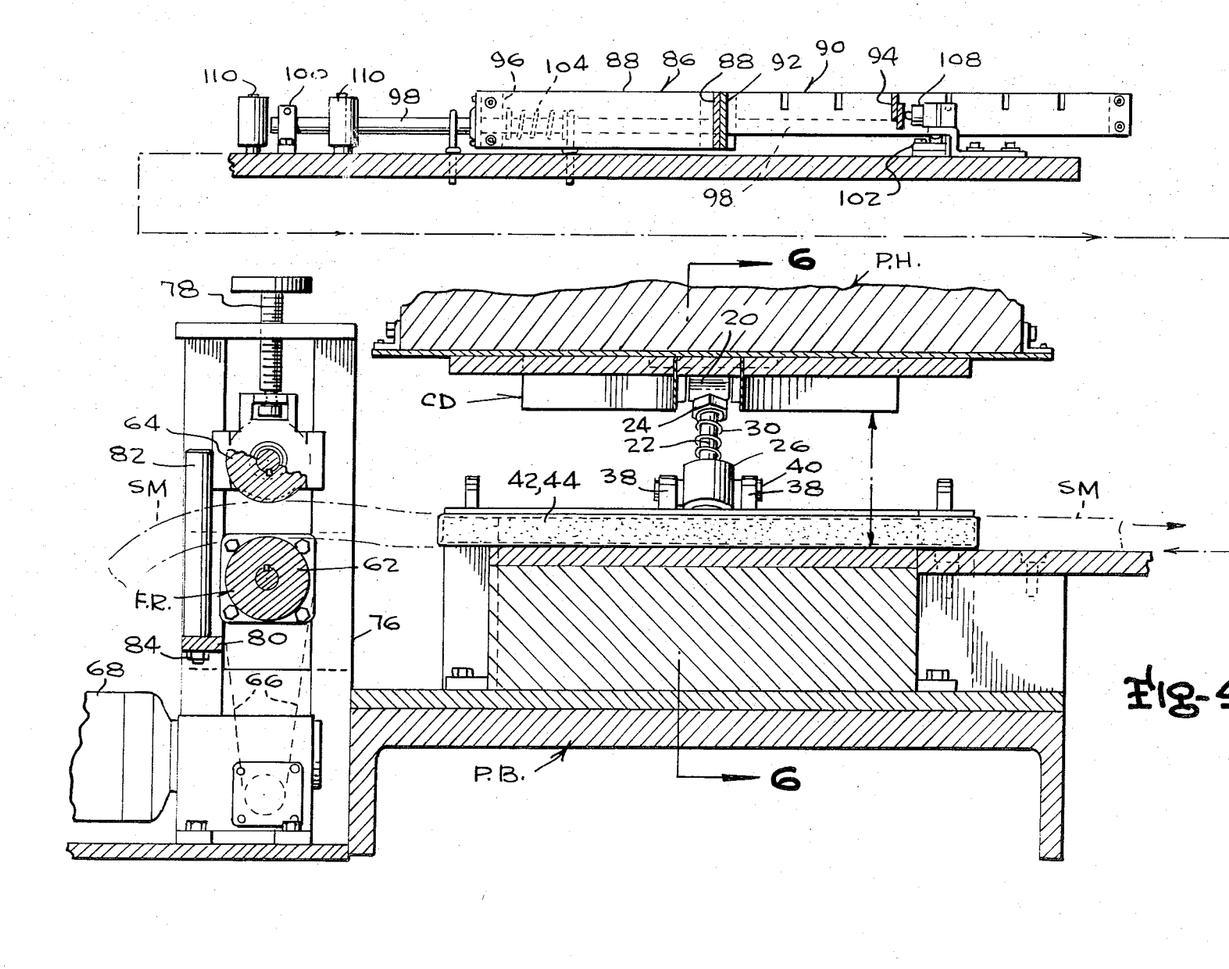
FIG. 4 is a transverse cross-sectional view on the same scale as FIG. 2 and viewed substantially on line 4—4 in FIG. 2 (and 3) more clearly showing structural detail of the material feeding and the positioning mechanism of the preceeding figures.
Figure 6:
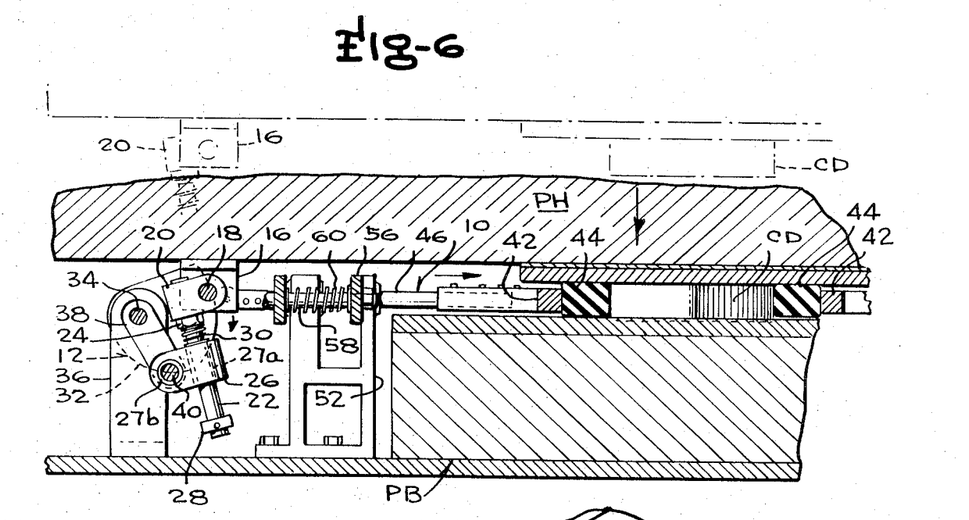
FIG. 6 is a correspondingly scaled detail view taken substantially on line 6—6 of FIG. 4, but with the press head fully lowered, thus cam-forcing the material positioning-and-holding bars into operative holding position against both sides of the strip material during the die cutting operation.

The pivot pins 18 permit the push shafts 22 to follow an arcuate travel path created by rotative movement of the cam-shaft-connecting arms 38 during the downward and upward movement of the press head PH during a press cycle. Some of these relative movements or positions are shown in the FIGS. 2, 5 and 6, of which FIG. 5 depicts a condition intermediate the fully raised condition of FIG. 2 and the fully lowered condition of the press head in FIG. 6. From viewing the said figures, it becomes apparent that the compression springs 30 serve a dual function, one of which is to compress the pivot blocks 26 in their places during part of the cycle. As is apparent from the drawings, when the press head PH lowers, the cam-shaft-connecting arms 38 are rotated from their fully raised position in FIG. 2, through an arc downwardly in a manner so that they stop at their fully lowered condition in an opposite but same relative degree setting from the vertical as that when in the fully raised condition. Thus, when the cam-shaft-connecting arms 38 reach their lowered fixed position, the compression springs' second function commences by their being compressed to permit the pushable drive shafts 22 to slidingly pass through the pivot blocks 26 so as to allow the press head PH to complete its cycle.

The material positioning-and-holding bar assemblies 10,10 at opposite sides of the press bed, which are actuated responsive to lowering of the press head and attendant limited rotation of the cams or cam members 32, now will be described in more detail. Each bar assembly 10 comprises an elongated positioning bar 42 preferably selectively faced with a resilient rubber holding cushion 44 adaptable to abuttingly hold the sides of the strip cellular material without deforming it during die cutting. Bar 42 is rigidly connected preferably near its opposite ends with a pair of transversely extending guide rods 46,46 each of whose ends remotely opposite the bar have a cam follower 48. The cam followers 48 are preferably of a roller type of other suitable anti-friction character, and are operatively engageable with the cam members 32. A cross-tie guide bar 50, preferably of flat rectangular form and cross-section, is spaced remotely from and parallel to the bar 42 and connects the ends of the guide rods 46,46 together in rigid form.

A pair of brackets 52,52 are disposed in fore-and-aft aligned relation upon and at opposite lateral sides of the press bed PB to support the guide rods 46,46. Each bracket 52 preferably comprises spaced arms having coaxial bearing means, such as a pair of coaxially alinged lineal travel roller bearings 54 in which each guide rod 46 is slidably and stably supported. The bar assemblies 10 further include resilient means to normally bias each cushion-faced rod 42 into a retracted non-gripping condition. The resilient means to achieve this may have various suitable constructions. One practical construction includes a stationary support bar 56 connectably mounted to the upper portions of each fore-and-aft pair of brackets 52, which is in parallel with and between the positioning bar 42 and the cross tie bar 50. A pair of fore-and-aft spaced spring guide rods 58,58 have one end suitably mounted on the stationary support bar 56 so that they project transversely therefrom toward and have their opposite free ends slidably pass through complemental apertures provided in the cross tie guide bar 50. A compression spring 60 surrounds each guide rod 58 with the spring ends bearing against opposed faces respectively of the cross tie bar 50, and the stationary support bar 56. Accordingly they hold the positioning bars in their normally retracted condition, and simultaneously normally compress the cam followers 48 against the cams 32 at all times.

The cams and all related elements in the motivation assembly 14 are so proportioned, interrelated and moved in timed sequence so that responsive to the downward cycling movement of the press head, the positioning and holding bars, with their rubber facings 44, are mechanically moved to grip and hold the strip of stock material being fed into the press during the die cutting with the holding bars then being mechanically released by the spring action in proper timed sequence. The operation will be elaborated upon in greater detail hereinafter.

At the front of the press there is a preferably automated material feed and guide roller mechanism or assembly FR, to be described; and, in general fore-and-aft alignment with the feed roller assembly FR thereof, and toward the rearward part of the press, is the material stopping and switch activating mechanism SSM, also to be described hereinafter.

The feed and guide roller assembly FR and the material stopping and switch activating mechanism SSM embody various interrelated manually and automatically operable switches and related electrical circuitry to provide a preferred mode of mechanical-electrical operation in timed sequence with the press cycle.

The feed roller assembly FR comprises a lower driven roller 62 and an adjustably mounted upper idler roller 64, the latter of which also alternately may be connected to the drive chain 66. A motor and drive pulley assembly 68 is mounted on the lower press bed as shown, so as to connect drive chain 66 via a clutch 70 operatively with said lower drive roller 62. A suitable brake means 72 is also preferably operably connected with the lower drive roller 62, which clutch and brake are electrically energized in proper timed sequence, as will be further explained.

The electric motor 68 is suitably powered, as by an exemplary 115 volt A.C. input, 90 volt D.C. output power supply unit designated 74 (FIG. 2). The motor 68 may be a ¼ H.P. 1750 rpm 115 volt 60 cycle A.C. motor having a 20 ratio single reduction worm gear drive.

The rollers 62,64 are supported by their shafts in a conventional manner in bearing blocks carried by a pair of opposed upright standard brackets 76,76. Brackets 76 are attached to the press base, and the upper ends are preferably bifurcated and the bearing blocks for the upper roller are adjustably mounted in the bifurcated portions. Adjustment means 78 are provided to raise and lower the upper roller 64 to accomodate different thickness stock material to be fed therein. A stabilizing cross-tie bracket 80 transversely interconnects the upright support brackets 76,76, and in turn supports a pair of guide rollers 82,82 to centrally guide the stock material as it is fed into the press. Rollers 82 are interchangeably and adjustably mounted, as by stud and nut assemblies 84, to vary the space therebetween to accomodate stock material of different widths.

Reverting to the rearwardly located mechanism, including the SSM (FIG. 3), this mechanism's purpose is basically to stop the material being fed through after gauging its length as required for the type of product article being die cut.

A material stop generally denoted 86 embodies a concavely contoured strap-like seat 88 to complementally receive the complementally cut covex end of the resilient stock material passing rearwardly. Seat 88 has its ends connected to the front ends of a pair of laterally spaced, elongated, open-centered side frame members 90, the latter of which are further interconnected by a transverse intermediate tie member 92 and a rearward tie member 94 (FIG. 3), to hold the side frame members 90 in parallel spaced relation. The side frame members 90 are provided with fore-and-aft rod-bearing blocks or members 96 to facilitate slidable mounting thereof on correspondingly disposed rods 98. Rods 98 are supported by conventional support brackets 100 at the forward end, and by special support means 102 at the rearward end to facilitate alignment adjustment of the rods. The rod support brackets 100 are preferably adjustably mounted in a plurality of selective mounting holes to facilitate varying the distance of the stop assembly from the cutting die. In this manner, the articles to be cut, such as life-saving belts, can be made in a plurality of different lengths.

The stop assembly 86 is resiliently mounted on the rods by means of rod-encircling springs 104 and stop collars or brackets 106. The springs are interposed between and bias against said stops 106 and the forward bearing blocks 92, as shown. The amount of resilient slidable movement of the stop assembly 86 is predetermined. A micro-switch 108 is mounted centrally behind and for periodic activating engagement by the intermediate tie bar 94 of the stop assembly, attendant rearward travel thereof. This is responsive to the stock material being fed rearwardly upon manual activation first of the momentary override switch S1 (FIGS. 2 and 3) at the front of press, and secondly of the 3-way switch S2 at the back of the press bed. Switch S1 is used by the operator to initiate a temporary feed while getting the stock material properly positioned and started in the feed roller mechanism. Once initially started, the operator uses the switch S2 to establish the automatic feeding in conjunction with the press circuitry.

A pair of press-cycling switches S3,S3' (FIG. 3) may be suitably mounted adjacent the rearward bed portion of the press beyond switch S2 to control the down and up cycles respectively of the press head.

The micro-switch 108, which is preferably of the three pole-common, normal open and normal closed type, is connected to the 115 V.A.C. input, 90 V.D.C. output power supply unit 74. Said unit 74 is preferably used to power control both the clutch means 70 and the brake means 72, which components in a practical embodiment are both of a 90 V.D.C. electrically activated type. The clutch and brake means are both preferably mounted on the bottom feed roller 62.

BRIEF REVIEW OF OPERATION

Figure 1:
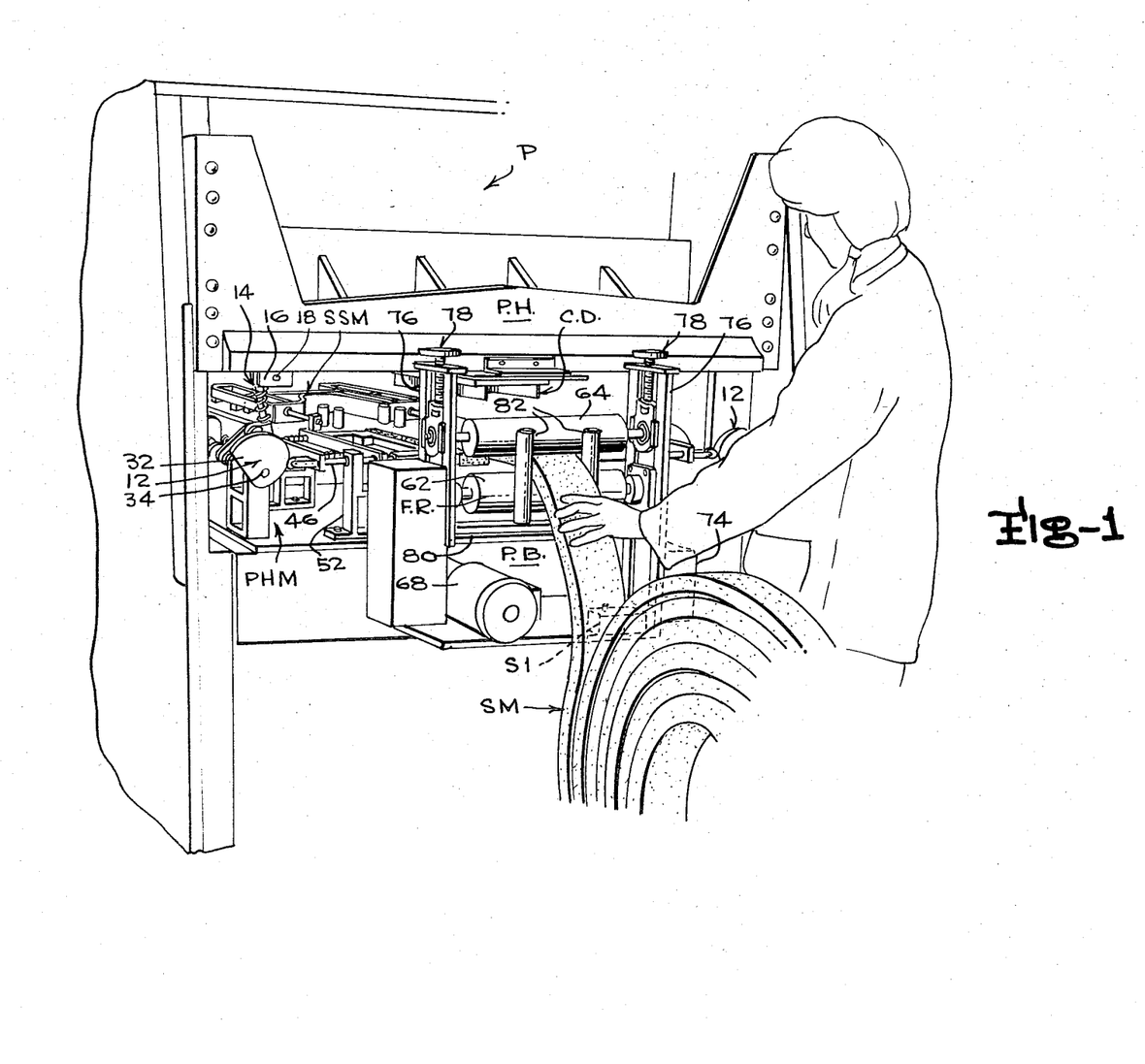
FIG. 1 is a perspective view showing portions of the press, a supply of resilient stock material being fed by automatic feeding means between feeding rollers into the material-positioning and die-cutting mechanism beneath the press head.

The operator places the lead end from the roll of a suitably suspended reel or roll of stock material SM into the nip between both the guide rollers 82 and the lower and upper feed rollers 62 and 64, as per FIG. 1. Then the momentary override switch S1 (FIGS. 1, 2 and 3) is manually activated to initiate a temporary power feed of the stock material via the electric motor 68 and power clutch 70 components. Thereafter, the operator moves to the rear of the press to ascertain that the resilient cellular stock material is being properly guided between opposed anti-friction rollers or other suitable guide pins 110 which can be adjustably mounted both laterally and longitudinally in plural sets of mounting holes 112. He then sets the switch S2 on its automatic feed position, and the material continues to feed into the press beneath the press head. Upon the material striking the yieldably-mounted stop or seat member 88, the latter relates this slight movement to activate the micro-switch 108, which in turn deenergizes the electric clutch means 70 and simultaneously energizes the electric brake means 72.

While standing adjacent the rearward portion of the press, the operator then sequentially closes the switches S3 and S3' (FIG. 3) to activate the press cycle downwardly and then upwardly.

During downward movement of the press head PH, the afore described motivation elements are mechanically activated whereby the bar assemblies 10,10 of the positioning and holding mechanism PHM carry out their respective functions to accurately position and properly hold the stock material during the cutting by the die CD in a predetermined timed cycle.

The cams 32 have an accelerated rise dwell, and are constructed of two main functional radii, joined by a small tangent radius. The rise radius closes the positioning bars, 42 the dwell radius maintains the bars in place until press head PH makes one-half cycle, cutting through the stock. As the press head rises the cams reverse, maintaining dwell until the press head makes three-fourth cycle, then cam function makes fall which releases positioning bars.

Figures 7, 8:
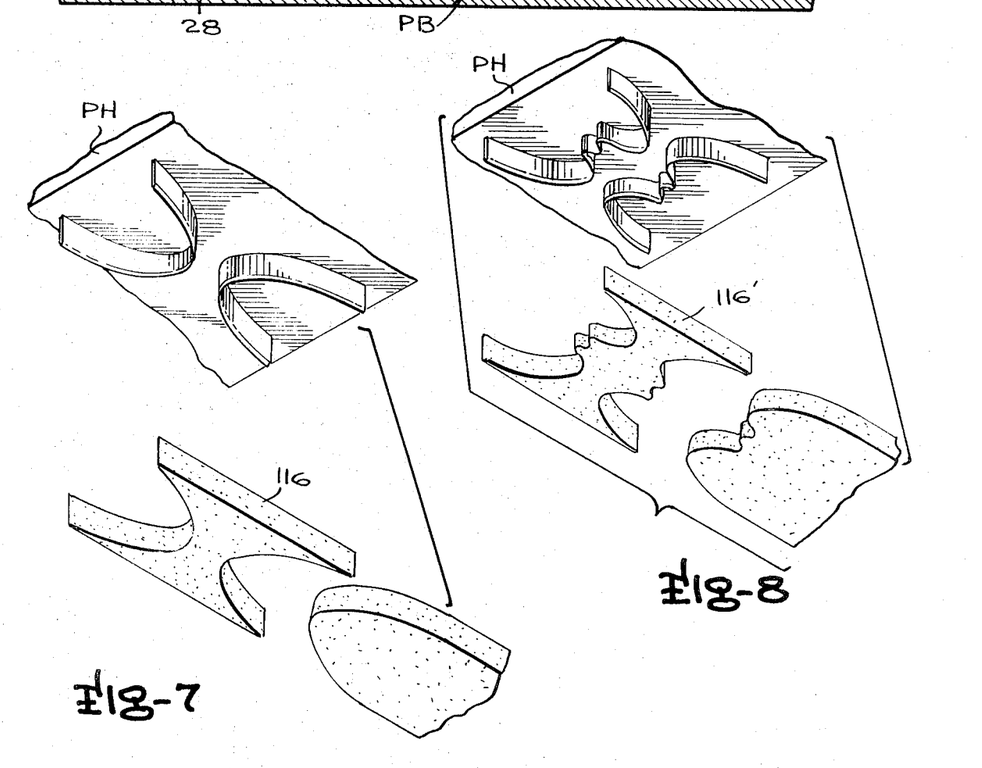

After cutting is effected, the holding and positioning bars are returned to their released condition, as explained hereinabove, during the upward cycle of the press head. Thereafter, the operator removes the cut part designated 114 (FIG. 3), and any waste part such as that depicted at 116 in FIGS. 3 and 7, and 116' in FIG. 8. The cutting dies are preferably of a thin steel or other sutiable rigid material cutting against a hard surfaced and preferably metallic cutting plate or block affixed to either a suitable support on or the top surface of the press base P.B. The cutting die members C.D. when cutting low density material, may be of a steel band-like material set into or upon a plywood or other material mounting block. The block then may be removably mounted to the press head PH. The material of the cutting die members may vary according to the material being cut. By use of double dies of the type shown in FIGS. 7 and 8, which shape the contoured ends of the material to be used for water skiers' life preserver belts, the end of the incoming stock material is contoured to nest within or otherwise complementally mate with the contoured stop seat member 88, thereby assuring of correct length or belt article each cutting cycle.

Upon the operator's removal of the cut length of material the spring biased stop assembly 86 moves away from contact with the micro-switch 108, thus deenergizing the brake 72 and again energizing the clutch means 70 to thereby automatically feed the material for the next cut.

CONCLUSION

From the foregoing detailed description and the illustrative drawings, it is apparent that inventive facets of both a novelly improved method of and apparatus for die cutting resilient and cellular type material and related feeding system has been evolved which achieves all of the objectives and advantages set forth in the preamble and other portions of this application.

While a rather specific and detailed exemplary embodiment of this invention has been presented hereinabove, it is recognized that other changes or modifications may be evolved by those skilled in the art without departing from the inventive spirit and scope as defined in the appended claims.

What is claimed is:

1. A positioning and holding mechanism for accurately positioning and holding lengths of rubber, plastic and other resilient material of strip form during diecutting in conjunction with a press having a reciprocable die-carrying press head movable toward and away from a press- or die-bed upon which said strip material is supported during the cutting thereof, said mechanism comprising in combination:
    a. a pair of rotary cam-operated, laterally reciprocable positioning-and-holding bar assemblies mountable on said press bed at opposite sides of a central feed path for said strip material each of said bar assemblies including:
        1. an elongated rigid bar structure having a gripping edge disposable parallel to the strip material to be fed in a fore-and-aft direction through the press.

2. rod means on said bar structure and extending transversely away from the gripping edge, and having cam follower means at an end oppositely remote from said gripping edge.

3. press-supportable bracket means for slidably supporting said rigid bar structure via its rod means to facilitate lateral reciprocation of said bar structure between gripping and non-gripping positions; and 4. resilient means operatively interposed between said bracket means and rigid bar structure to normally bias said bar structure to a neutral non-gripping position away from the strip of material to be gripped and die-cut, and to constantly urge said cam follower means of said bar structure's rod means into engagement with said rotary cams; and b. a pair of motivation linkage assemblies mountable at lateral opposite sides of a cutting die and so as to depend from beneath said press head, and operatively connected via said rotary cams with said positioning-and-holding bar assemblies, said linkage assemblies being operative responsive to down and up cycling of said press head to effect said reciprocable movement of said bar assemblies to properly position and hold said strip from opposite longitudinal sides thereof during cutting.

2. A positioning and holding mechanism as defined in claim 1, wherein each of said rotary cams have camming surfaces comprising two main functional radii interjoined by a tangent radius, and are fixedly mounted eccentrically on rotatable cam shafts disposed parallel to said material-feed path and the longitudinal gripping edge of said bar structure of paragraph a1, said rotatable cam shafts having actuating crank arms attached thereto; and said linkage assemblies respectively including angular links having one end respectively pivotally mountable to and beneath said press head and with respective opposite ends associated with means pivotally connectable with said respective actuating crank arms of said rotary cams shaft so as to provide requisite cyclic positioning, holding and subsequent release of said strip material responsive to said down and up cycling of said press head.

3. A positioning and holding mechanism as defined in claim 2, wherein said angular links of said linkage assemblies include respective longitudinally adjustable drive shaft members each having a free end slidably connected to and through an aperture in a pivot block, the latter of which at a point offset from said aperture provides said means for effecting pivotal connection with said crank arms of said rotary crank shaft; said mechanism further including compression springs encircling said respective drive shaft members to continually bias said respective pivot blocks against adjustable stops on said free end of said drive shafts.

4. A positioning and holding mechanism as defined in claim 3, wherein said angular links of said linkage assemblies, as disposed at said lateral opposite sides of said cutting die, are disposed relative to one another so as to have their respective ends which slidably traverse said respective pivot blocks converge only slightly toward said strip material and one another when in a normal non-operative or non-gripping position; and said crank arms of said rotary cam shafts when in said same position extend angularly upright therefrom and also converge toward said strip material and one another; said angular dispositions and biasing of said linkage assembly components contributing to lock-free operation of the mechanism.

5. A positioning and holding mechanism as defined in claim 4, wherein said crank arms and angular links are so proportioned and interrelated that when said rotary cams are operatively rotated and said press head is in a fully lowered cutting position attendant the downward press cycle, said crank arms are downwardly disposed at the same relative angle from a vertical reference line as when upwardly and oppositely disposed in said normal non-operative or non-gripping position.

6. A positioning and holding mechanism as defined in claim 1, wherein each of said elongated rigid bar structures of paragraph a1 has resilient cushioning means along said gripping edge, which cushioning means is deformable to accomodate frictional gripping of material strips of slightly varying width.

7. A positioning and holding mechanism as defined in claim 1, wherein each of said elongated rigid bar structures of paragraph a1 has resilient cushioning means along said gripping edge; and said rigid bar structure and rod means having adjustable connecting means to vary the distance from said gripping edge to said cam follower means, by which said adjustable connecting means and said cushioning means collectively provide means for said mechanism to frictionally grip material strips of widely varying width.

8. A system for sequentially feeding positioning, holding and die cutting into predeterminable lengths a supply strip of rubber, plastic and other resilient and semi-resilient material in conjunction with a power-operated press having a reciprocable cutting die-carrying press head movable toward and away from a press- or die-bed upon which said strip material is supported during the operation thereof, said system comprising in combination a. means for guiding a continuous strip supply of said material into and through said press between the press head and press or die-bed;

b. a positioning and holding mechanism for accurately positioning and holding the strip material during die-cutting thereof; said mechanism comprising 1. a pair of rotary cam-operated laterally reciprocable positioning-and-holding bar assemblies mounted on said press bed at opposite sides of and uniformly spaced from a guide path for said strip material;

2. a corresponding pair of motivating linkage assemblies respectively operatively connected with said respective rotary cam-operated positioning-and-holding bar assemblies, said linkage assemblies each including component means dependingly attached to said press head and operative responsive to downward and upward cycling of said press head during die-cutting;

c. cutting die means including a cutting die of predetermined configuration affixed to a lower portion of said press head, for engagement with a die-bed oppositely therefrom on said press.

d. material stop and length-guaging means at a rearward press portion behind said die-bed, and including adjustment means to facilitate adjustable disposition of the stop means to enable cutting said strip material into different predeterminable lengths; and e. electrical circuitry embodying switch means for selectively activating the downward and upward cycling of said power-operated press head by a single operator.

9. A system as defined in claim 8, further including means for effecting both manual and automatic electrically powered feeding of said strip material into said press.

10. A system as defined in claim 9, wherein the electrical circuitry includes a subcircuit and switch means interrelated with said automatic feeding; and said material stop and length-gauging means of paragraph d include resilient means for mounting a stop member thereof so as to be moved by the feeding strip material and thereby yieldable retract against and temporarily trip a relay switch of said subcircuitry to interrupt said automatic feeding of said strip material preparatory to the downward cycling of and die-cutting by said cutting die means; said circuitry being such as to automatically restart said automatic feeding of said strip material responsive to subsequent manual removal of the cie-cut strip of material from the die-bed.

11. A system as defined in claim 10, wherein said cutting die includes a cutting edge of predetermined shape, and said material stop member includes a seat member contoured to correspond with said predetermined shape of said die-cutting edge, to thereby complementally receive a cut edge of an advancing strip of material therein and to establish predetermined uniform lengths of said strip material being cut.

12. A system as defined in claim 11, wherein said cutting die includes double cutting edges of predetermined different outline shape to correspond with and to simultaneously cut two separate end configurations for the strip material, said double cutting edges constituting means to provide respectively opposite hand terminal cuts to the strip material, one of which completes a final cut for an outgoing completed predetermined length of said strip material, and the other of which constitutes a first cut of the next-in-line segment of strip material.

13. A system as defined in claim 9, wherein said means of paragraph a for guiding said strip material into said press include a pair of horizontal rollers spaced vertically apart to frictionally grip the thickness of the material, and a pair of vertical rollers spaced laterally apart corresponding to the width of said material, said vertical rollers disposed adjacent said horizontal rollers, and both pair of rollers disposed at an entry side of said press.

14. A system as defined in claim 13, wherein said horizontal pair of rollers also constitute part of said means for automatically feeding said strip material into the press, and at least one of said horizontal rollers being driven by an electrical power source connected into said circuitry, which circuitry includes a start-and-stop switch selectively manually operable to facilitate initiating infeed of said strip material.

15. A system as defined in claim 14, wherein said means for effecting said automatic power feeding of said strip material include an electrically activated clutch means and an electrically activated brake means operatively connected with one of said horizontal rollers.

16. A system as defined in claim 15, wherein said circuitry includes interrelated subcircuits for effecting substantially simultaneous activation of said clutch means with a de-activation of said brake means, and vice versa.

17. A system as defined in claim 13, further including means for selectively adjusting the spacing between said pairs of rollers to accomodate strip material of varying thickness and width.

18. A system as defined in claim 8, wherein said means of paragraph a for guiding said strip material through said press further includes anti-friction guide means including at least one pair of generally cylindrical members disposed at the rearward portion of said press bed with their axis vertically, and disposed at laterally opposite sides of said feed path.

19. A system as defined in claim 18, including a plurality of said anti-friction guide means, and having means to mount them in rows of selectively variable distances apart to accomodate strip material of different predetermined widths.

20. A system as defined in claim 8, wherein each of said positioning-and-holding bar assemblies of paragraph b1 include
1. an elongated rigid bar structure having a gripping edge disposable parallel to the strip material to be fed in a fore-and-aft direction through the press;
2. rod means on said bar structure and extending transversely away from the gripping edge, and having cam follower means at an end oppositely remote from said gripping edge;
3. press-supportable bracket means for slidably supporting said rigid bar structure via its rod means to facilitate lateral reciprocation of said bar structure between gripping and non-gripping positions; and
4. resilient means operatively interposed between said bracket means and rigid bar structure to normally bias said bar structure to a neutral non-gripping position away from the strip of material to be gripped and die-cut, and to constantly urge said cam follower means of said bar structure's rod means into engagement with said rotary cams.

21. A system as defined in claim 20, wherein each of said elongated rigid bar structures include selectively applicable resilient cushioning means to define a material gripping edge; and said rigid bar structure and rod means having adjustable connecting means to vary the distance from said gripping edge to said cam follower means, by which said adjustable connecting means and said cushioning means collectively provide means for said mechanism to frictionally grip material strips of widely varying width.

22. A system as defined in claim 8, wherein said positioning-and-holding bar assemblies of paragraph b1 each include an elongated rigid bar structure having a resilient gripping edge parallel to the edges of the strip material to be gripped therebetween; wherein said rotary cams have camming surfaces of generally parabolic character and are fixedly mounted eccentrically on rotatable cam shifts disposed parallel to said material-feed path and to the longitudinal gripping edge of said bar structure of paragraph a1, said rotatable cam shafts having actuating crank arms attached thereto; and said component means of said linkage assemblies respectively including angular links having one end respectively pivotally mountable to and beneath said press head and with respective opposite ends associated with means pivotally connectable with said respective actuating crank arms of said rotary cams shaft so as to provide requisite cyclic positioning, holding and subsequent release of said strip material responsive to said down and up cycling of said press head.

23. A system as defined in claim 22 wherein said angular links of said linkage assemblies include respective longitudinally adjustable drive shaft members each having a free end slidable connected to and through an aperture in a component pivot block associated therewith, the latter of which at a point offset from said aperture provides said means for effecting pivotal connection with said crank arms of said rotary crank shaft; said linkage assemblies further including compression springs encircling each of said drive shaft members to continually bias said pivot block against an adjustable stop on a free end of said drive shaft.

24. A system as defined in claim 23, wherein said angular links of said linkage assemblies are disposed at said lateral opposite sides of said cutting die, are disposed to provide some lost motion as they slidably traverse said respective pivot blocks, and are disposed relative to one another so as to have their respective ends converge only slightly toward said strip material and one another when in a normal non-operative or non-gripping position; and said crank arms of said rotary cam shafts when in said position extend angularly upright therefrom and also converge toward said strip material and one another; said angular dispositions and biasing of said linkage assembly components contributing to an effective and lock-free operation of the mechanism.

25. A system as defined in claim 24, wherein said crank arms and angular links are so proportioned and interrelated that when said rotary cams are operatively rotated and said press head is in a fully lowered cutting position attendant the downward press cycle, said crank arms are downwardly disposed at the same relative angle from a vertical reference line as when upwardly and oppositely disposed in said normal non-operative or non-gripping position.

* * * * *